(12) United States Patent
Mainardi

(10) Patent No.: US 10,882,422 B2
(45) Date of Patent: Jan. 5, 2021

(54) SEAT FOR VEHICLES WITH SEGMENTED BACKREST AND MOVABLE LUMBAR PORTION

(71) Applicant: C.O.B.O. S.P.A., Leno (IT)

(72) Inventor: Gino Mainardi, Leno (IT)

(73) Assignee: C.O.B.O. S.P.A., Leno (IT)

(\*) Notice: Subject to any disclaimer, the term of this patent is extended or adjusted under 35 U.S.C. 154(b) by 0 days.

(21) Appl. No.: 16/462,746

(22) PCT Filed: Nov. 15, 2017

(86) PCT No.: PCT/IB2017/057121
§ 371 (c)(1),
(2) Date: May 21, 2019

(87) PCT Pub. No.: WO2018/096422
PCT Pub. Date: May 31, 2018

(65) Prior Publication Data
US 2019/0291611 A1    Sep. 26, 2019

(30) Foreign Application Priority Data
Nov. 24, 2016  (IT) .................. 102016000118993

(51) Int. Cl.
*B60N 2/22* (2006.01)
*B60N 2/66* (2006.01)
(Continued)

(52) U.S. Cl.
CPC ......... *B60N 2/2222* (2013.01); *B60N 2/0224* (2013.01); *B60N 2/12* (2013.01);
(Continued)

(58) Field of Classification Search
CPC ...... B60N 2/2222; B60N 2/665; B60N 2/666; B60N 2/643; B60N 2/68; B60N 2/0224; B60N 2/12; B60N 2/3011
(Continued)

(56) References Cited

U.S. PATENT DOCUMENTS

| 4,679,854 A | 7/1987 | Putsch et al. |
| 5,335,965 A | 8/1994 | Sessini |

(Continued)

FOREIGN PATENT DOCUMENTS

| DE | 3511216 C1 | 5/1986 |
| DE | 4405397 C1 | 3/1995 |
| EP | 1724148 A1 | 11/2006 |
| WO | 02074576 A1 | 9/2002 |
| WO | 2009050746 A2 | 4/2009 |

OTHER PUBLICATIONS

PCT International Search Report for PCT/IB2017/057121 dated Jan. 22, 2018 (5 pages).

*Primary Examiner* — Mark R Wendell
(74) *Attorney, Agent, or Firm* — Pearne & Gordon LLP

(57) ABSTRACT

A seat (1) comprises a seating surface (2) suitable to receive a user and a backrest (3) adaptable according to the user's needs. The seat further comprises a support structure (4) configured to connect the seat to the backrest. The backrest comprises an upper shoulder portion (6) and a lower lumbar portion (7) and the lumbar portion is movable along the support structure while the shoulder portion remains at a fixed height with respect to the support structure (4).

19 Claims, 4 Drawing Sheets

(51) Int. Cl.
  *B60N 2/02* (2006.01)
  *B60N 2/12* (2006.01)
  *B60N 2/30* (2006.01)
  *B60N 2/64* (2006.01)
  *B60N 2/68* (2006.01)

(52) U.S. Cl.
  CPC ............ *B60N 2/3011* (2013.01); *B60N 2/643* (2013.01); *B60N 2/665* (2015.04); *B60N 2/666* (2015.04); *B60N 2/68* (2013.01); *B60N 2002/022* (2013.01); *B60N 2002/2204* (2013.01); *B60Y 2200/22* (2013.01)

(58) Field of Classification Search
  USPC ........................................................ 297/312
  See application file for complete search history.

(56) References Cited

U.S. PATENT DOCUMENTS

| | | | |
|---|---|---|---|
| 6,530,622 B1 | 11/2003 | Ekern et al. | |
| 2006/0082182 A1 | 4/2006 | Saberan et al. | |
| 2012/0267928 A1* | 10/2012 | Mankame | B60N 2/919 |
| | | | 297/284.4 |
| 2014/0265501 A1 | 9/2014 | Line et al. | |
| 2016/0037928 A1* | 2/2016 | Cali, Sr. | A47B 13/003 |
| | | | 297/135 |
| 2017/0088029 A1* | 3/2017 | Mizoi | B60N 2/665 |
| 2018/0022246 A1* | 1/2018 | Patrick | B60N 2/0252 |
| | | | 297/284.3 |
| 2018/0304774 A1* | 10/2018 | Mizoi | A61B 5/18 |
| 2019/0193592 A1* | 6/2019 | Tarui | B60N 2/0248 |

\* cited by examiner

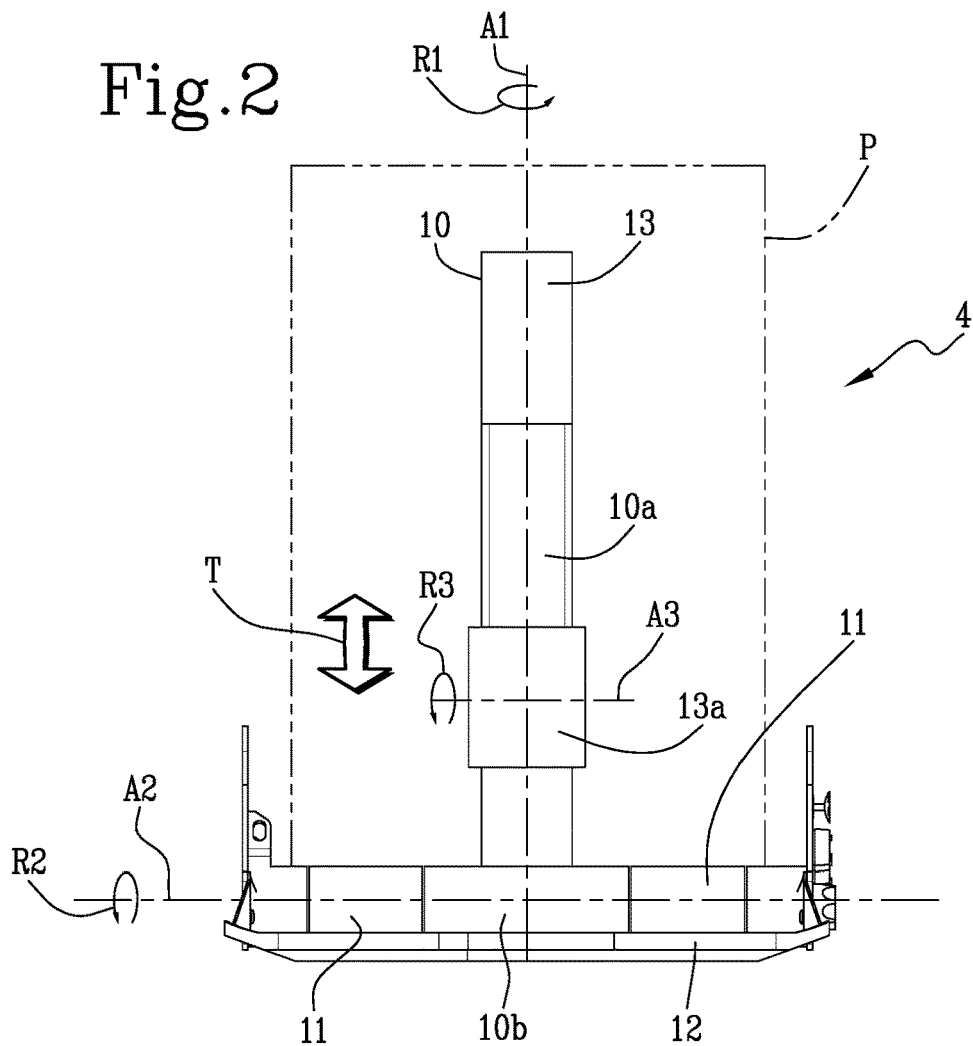
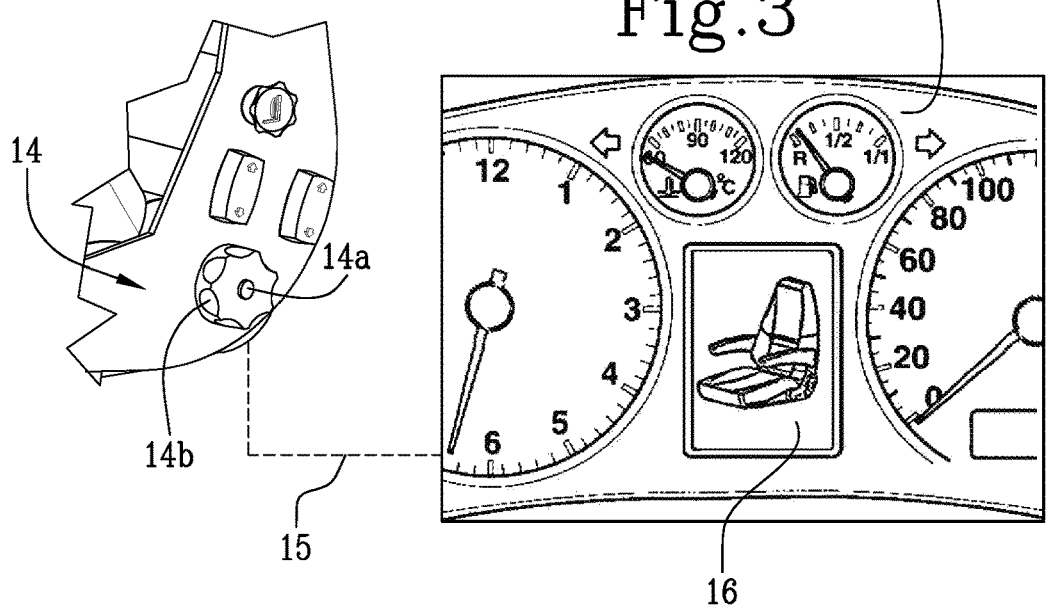

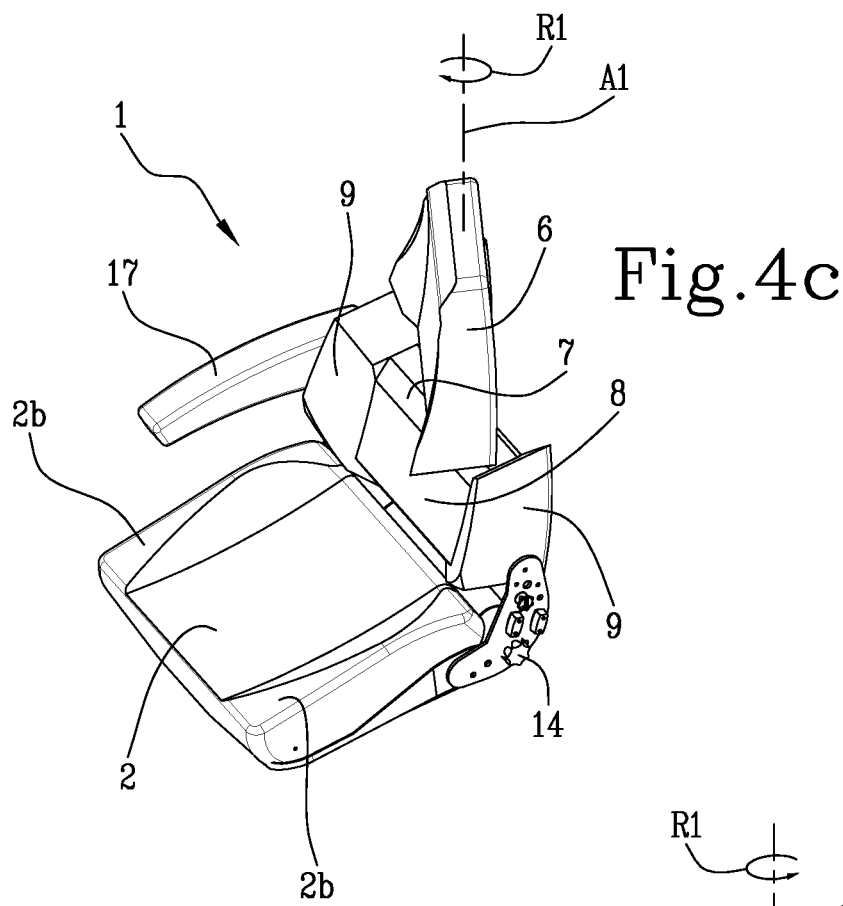
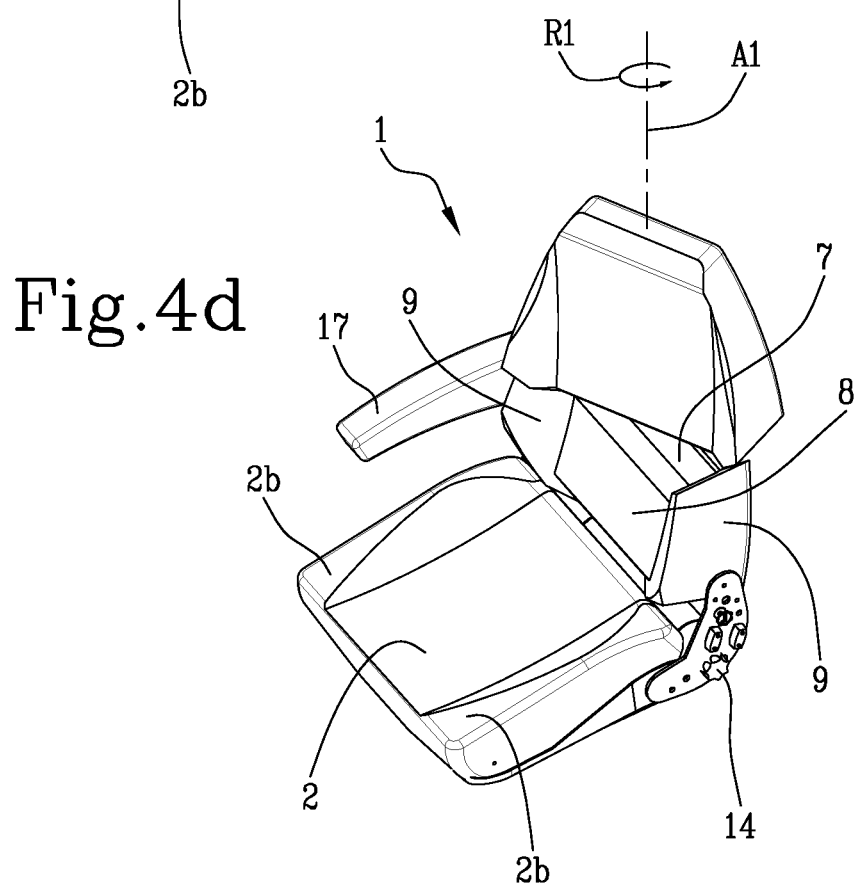

SEAT FOR VEHICLES WITH SEGMENTED BACKREST AND MOVABLE LUMBAR PORTION

The present invention relates to a seat for agricultural vehicles or more in general for vehicles for commercial or industrial use such as for example machines used for earth-moving and in construction sites or the like.

Known vehicle seats (e.g., for agricultural vehicles such as the so-called "tractors") which are installed in the cockpit of the vehicle itself. It is important that the user is be able to drive with extreme comfort, while operating agricultural vehicles such as tractors or other similar means. In particular, the user of these agricultural vehicles should be able to use them for a long period, or for prolonged sitting periods, anyway. It is therefore very important for the seat to meet specific characteristics in order to allow the user to be completely at ease while driving. The agricultural machine seats are produced with specific characteristics that allow to obtain specific results from the comfort point of view. Disadvantageously seats are not fully adjustable and therefore said characteristics are designed for a standard user not taking into account that even a very tall user or a very short user or one that needs a particular seating surface could have the need to use the seat. Even more disadvantageously seats can lead to problems from the visibility point of view, as for example when the user must turn around frequently to check the rear implement or in case it should perform a reverse manoeuvre, wherein the stiffness of the seat forces the user to perform movements necessarily involving a certain discomfort.

It is known in the majority of the seats that only a portion of the seat, the one linked to the shoulder portion of the backrest, is height adjustable (headrest): furthermore the seats are mounted in the agricultural vehicle cockpit with the only possibility to adjust its distance from the steering wheel.

Disadvantageously, this solution is unable to provide the right comfort to a user that should work with the agricultural machine for prolonged periods of time and therefore requires a higher degree of comfort resulting in a limited customization of the seat.

The object of the present invention is to provide a seat for agricultural vehicles that allows to overcome the drawbacks resulting from the prior art, in particular a seat that increases the comfort for the user. In particular the present invention aims to provide a seat for agricultural vehicles that allows to adjust the backrest of the seat itself so as to adapt to the needs of each type of user.

The mentioned technical task and the specified aims are substantially achieved by a seat for agricultural vehicles including the technical specifications set out in one or more of the appended claims.

Further characteristics and advantages of the present invention will become more apparent from the description of an exemplary, but not exclusive, and therefore non-limiting preferred embodiment of a seat for agricultural vehicles.

Such description will be set forth hereinafter with reference to the accompanying drawings given only for illustrative and, therefore, non-limiting purpose, in which:

FIG. 2 is a schematic representation of an first component of the seat of FIG. 1;

FIG. 3 is a schematic representation of a second component of the seat of FIG. 1 communicating with a component of the agricultural vehicle;

FIGS. 4a, 4b, 4c, 4d are a schematic representation of four operating configurations of the seat which is the subject of the invention.

With reference to the accompanying figures, 1 refers to a whole seat for agricultural vehicles in accordance with the present invention that, for the sake of simplicity, will be indicated hereinafter as seat 1.

Figure 1:
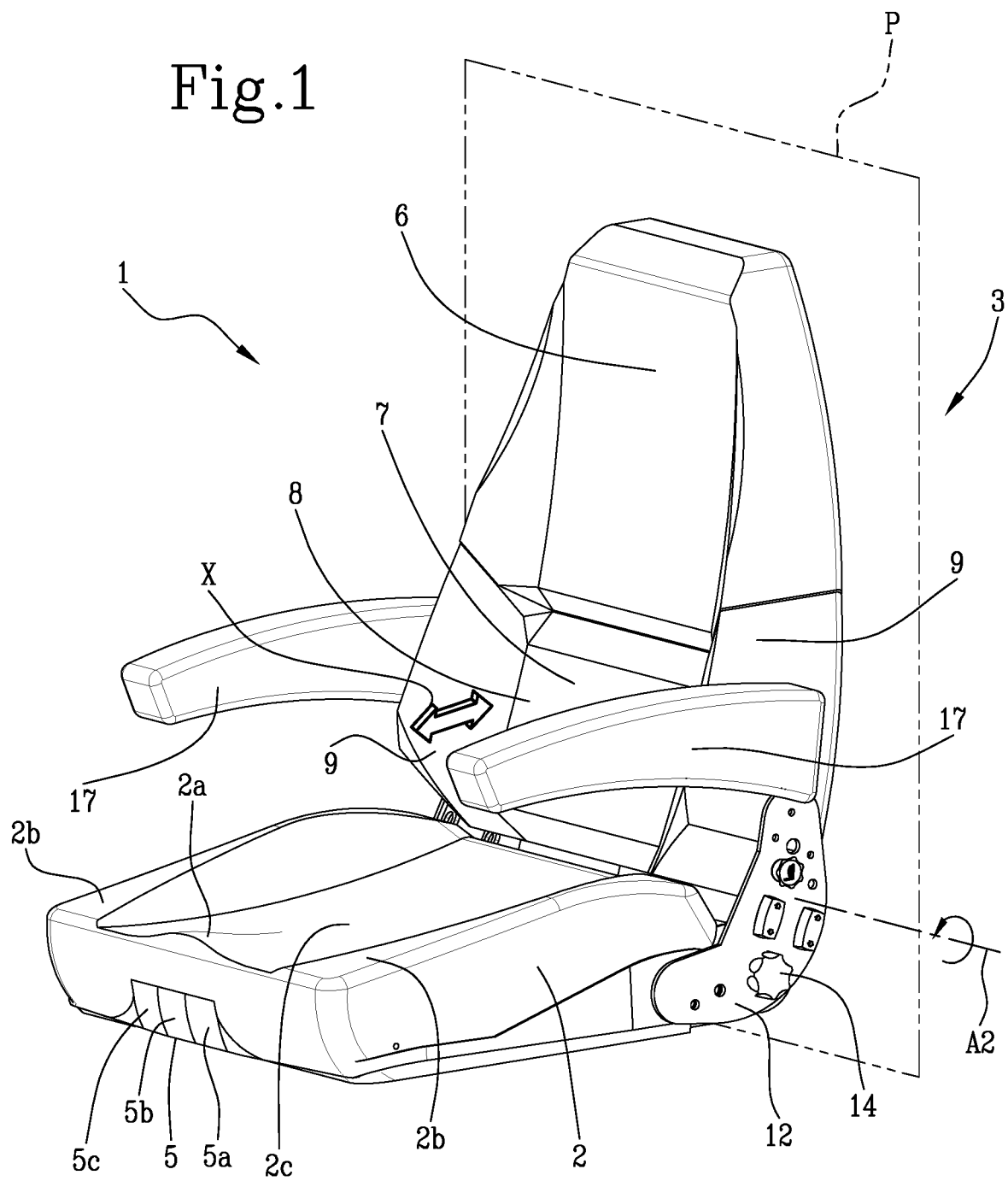
FIG. 1 is a schematic representation of a seat for agricultural vehicles according to an embodiment.

In FIG. 1, seat 1 is shown according to an embodiment thereof. The seat 1 comprises a seating surface 2 adapted to receive a user, a backrest 3 adaptable according to the needs of the user and a support structure 4, represented in FIG. 2, configured to connect the seating surface 2 with the backrest 3.

The seating surface 2 is shaped so as to allow a user to sit on it. The term user means a medium build person, but the seating surface 2 is designed to be used, and then customized, also by more robust people or someone whose body characteristics depart from the definition of medium build.

Depending on current needs, it is possible for the seating surface 2 to be shaped in a way to prevent the user's pelvis from sliding forward from the seat 1, in case of collision. In particular the shape is conceived in such a way as to prevent the user's pelvis from sliding forward, in case of collision.

Preferably the seating surface 2 comprises a first raised part 2a, positioned in a central and front position of the seating surface 2. The raised part 2a is shaped to prevent the user from sliding forward, with respect to the seat 1 (e.g., in case of descending machining with strong longitudinal slope).

Even more preferably the seating surface 2 comprises a second raised part 2b. The raised part 2b develops itself in the lateral positions of the seating surface 2.

In particular the first raised part 2a and the second raised part 2b form a cup-shaped portion 2c of the seating surface 2. The cup-shaped portion 2c is shaped to prevent the user's pelvis from sliding forward or laterally e.g., in the cases disclosed above.

The seating surface 2 comprises controls 5 to tilt, collapse and/or rotate and more in general to adjust the distance from the steering wheel of the seat 1 itself. In particular, in the embodiment of FIG. 1, the controls 5 (5a, 5b, 5c) can be found in the central and front position of the seating surface 2.

Even more in particular, the controls 5 are realized in the form of a single handle 5a wherein the handle is facing downwards (this handle can also be broken down into different parts, for example a number equal to three, in order to be able to better adapt to the current operational requirements). Preferably the handle 5 is arranged next to the raised part 2a, in a lower portion of the central and front position of the seating surface 2.

When being raised by the user, the central portion of the handle 5b allows the backrest 3 to tilt on the basis of the needs of the user himself. Moreover the handle 5b allows the entire backrest 3 to completely collapse on the seating surface 2. The handle portion 5a can be used to allow the seat (1) to be moved closer to or farther away from a steering wheel according to the user's needs. Finally, the handle portion 5c allows the seat 1 to rotate toward the right/left with respect to the axis perpendicular to the seat thanks to a suitable plate located under the seat.

Conveniently, the seat 1 comprises levers, mechanical and/or with servo assistance linkages for the implementation of the movements corresponding to the controls listed in the position 5 of the seat 1: in particular these engines and/or servo assistances have the function of moving the seat 1 as described above.

The backrest 3 comprises a shoulder portion 6 and a lumbar portion 7. In particular the backrest 3 is divided into two parts, an upper part (the shoulder portion 6) and a lower part (the lumbar portion 7).

The lumbar portion 7 further comprises a central lumber support 8 and lateral elements 9 for containment having a variable geometry. The central element 8 is preferably inflatable and may expand or move according to a given lying plane and exert a pressure on the lumbar part of the operator.

The lateral elements 9 are configured in order to improve the comfort of the user in case of strong transverse accelerations and lateral slipping in case of machining with strong cross slope and are preferably inflatable.

The lumbar portion 7, the shoulder portion 6 and the seating surface 2 are realized in the form of pillows. In particular the lumbar portion 7, the shoulder portion 6 and the seating surface 2 are formed so as to be as comfortable as possible and, on the basis of the user's needs, they can be realized with stiff or softer pillows.

The support structure 4, shown in FIG. 2 comprises a central module 10 and side brackets 11, as well as a base 12. In particular the central module 10 and the side brackets 11 are located in the backrest 3 and in the connecting portion between the seating surface 2 and the backrest 3 itself, as well as the base 12 is placed in the seating surface 2. Even more in particular the central module 10 is configured to allow the translation at the top and bottom of the lumbar portion 7 and the side brackets 11, arranged at the sides of the central module 10, are configured to connect to the base 12, which is configured to support the seating surface 2.

The base 12 preferably could comprise a recessed part 12a configured to receive the controls 5. In particular the recessed part 12a is arranged in a central and front portion of the base 12.

The side brackets 11 comprise spacers of different lengths as a function of the width of the seating surface 2.

The central module 10 comprises sliding linkage 10a and rotation linkages 10b. The sliding linkage 10a is configured to allow adjusting the height of the lumbar portion 7 maintaining the shoulder portion 6 fixed with respect to the height of the user.

The sliding linkage 10a comprises a sliding rail 13 and sliding units 13a and 13b for the adjustment of the lumbar portion 7. In particular, the sliding unit 13a is associated with the lumbar portion 7 itself and the sliding unit 13b to the shoulder portion 6. The sliding unit 13a is configured to be able to make the lumbar portion 7 movable along the portion of the central module 10a. Preferably the sliding unit 13a makes the lumbar portion 7 movable with a translation along the sliding mechanism 10a forming part of the central module 10. The lumbar portion 7 is therefore movable from a first position, illustrated in FIG. 4a, to a second position, illustrated in FIG. 4b, and vice versa. Obviously the two positions mentioned above are not the only ones that can be selected by the user while adjusting the lumbar portion. In the embodiment of FIG. 1, as well as in those of FIGS. 4a-4b, the shoulder portion 6 is maintained at a fixed height with respect to the support structure 4. In an embodiment, not shown, the shoulder portion 6 can also be set in motion thanks to the rotation of the only upper part 10b of the module 10.

Even more in particular, the sliding unit 13a is associated with the lumbar support 8 making the latter also adjustable in depth along a transverse direction "X" to a lying plane "P" of the backrest 3. Preferably, the transverse direction "X" is perpendicular to the lying plane "P" of the backrest 3 thanks to an inflatable blister or mechanical linkages that allows the displacement of a pressure element The rotation linkage 10b allows a "R1" rotation of the shoulder portion 6 of the backrest 3 around a rotation axis "A1" as shown in FIGS. 4c and 4d. The rotation axis "A1" parallel axially passes through the upper part 10b of the central module 10.

Another rotation linkage of the module 10 allows also a second rotation "R2" of the backrest 3 around a second rotation axis "A2" perpendicular to the first rotation axis "A1". In particular the rotation axis "A2" is placed at the base of the backrest 3, between the lumbar portion 7 and the seating surface 2.

Preferably the sliding unit 13a associated with the lumbar support 8 is further configured to allow the lateral elements 9 to rotate around a third rotation axis "A3". In particular the rotation axis "A3" is parallel to the axis "A2", and even more particularly it crosses the sliding unit 13a itself allowing the lateral elements 9 to rotate according to a third rotation "R3".

The seat 1 further comprises a control unit 14 for adjusting the lumbar portion 7. The control unit 14 is adapted to select one between the lumbar portion 7 or the lumbar support 8 in order to be able to impart configuration changes, such as, for example, those shown in FIGS. 4a and 4b. Furthermore, in the embodiment not shown it is possible to select the shoulder portion 6 for imparting configuration changes and e.g. to lock or unlock the rotation R1 around the axis A1.

The control unit 14 is further configured to implement the configuration changes. In particular the control unit 14 comprises a button 14a and a knob 14b. In particular the button 14a is configured to be pressed by the user, as well as the knob 14b is configured to be rotated by the user. The button 14a is thus configured to select one among the shoulder portion 6 or the lumbar portion 7 or the lumbar support 8 and the knob 14b is thus configured to implement one of the configuration changes of the selected element of the backrest 3.

Preferably the button 14a is integrated in the knob 14b in a central position with respect to the knob 14b itself. Even more preferably the button 14a is recessed in the knob 14b.

During use, when the button 14a is pressed or, depending on the possibilities to integrate or not the button function in the entire knob, the knob is rotated by the user and allows to select one between the lumbar portion 7, the shoulder portion 6 and the lumbar support 8. The knob 14b allows to adjust the position of the element of the seat that has been selected. In the embodiment wherein the button 14a is recessed in the knob 14b it is necessary that the control group 14 is completely pressed to change from a configuration in which only the button 14a is usable to a configuration in which only the knob 14b is usable and vice versa.

Preferably the knob 14b may comprise a connection 15, as shown in FIG. 3, with a screen interface 16. The screen interface 16 is preferably associated with an instrument panel 16a of the vehicle. In particular the screen interface 16 is slaved to the control unit 14 and allows to view on the screen which one between the lumbar portion 7, the shoulder portion 6 and the lumbar support 8 have been selected with the button 14a to be then adjusted with the knob 14b with one of the possible configuration changes and to consequently show the location, the usability and the function associated with the handle 5 (5a, 5b, 5c) as well as of any other control acting on the seat (if present).

Preferably the seat 1 comprises two armrests 17 configured to be raised if necessary.

Figure 4A:
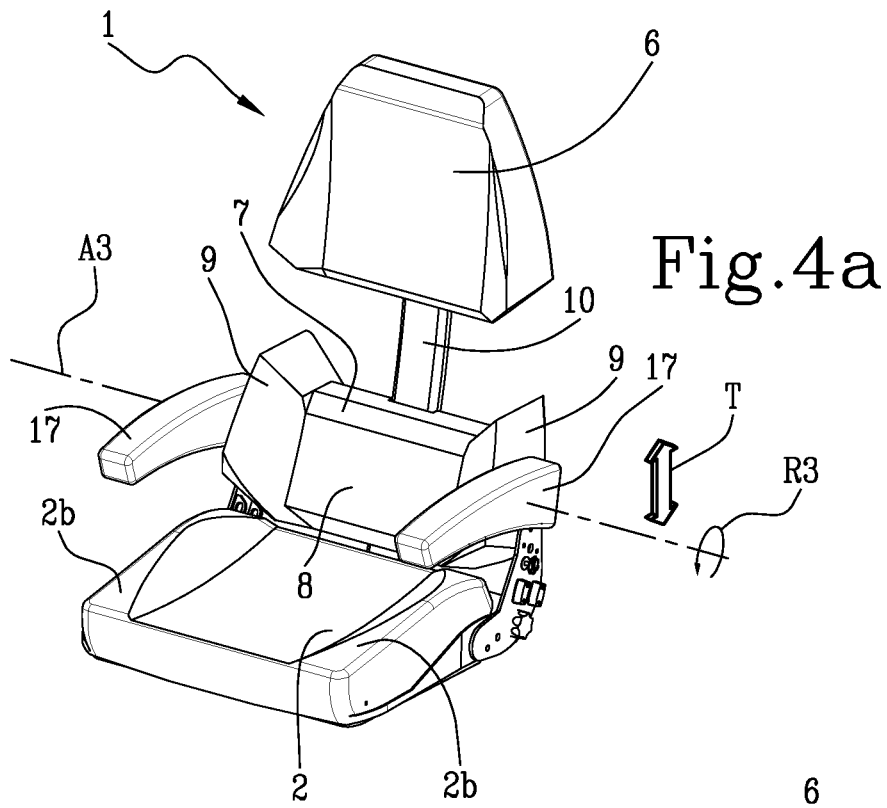
Figure 4B:
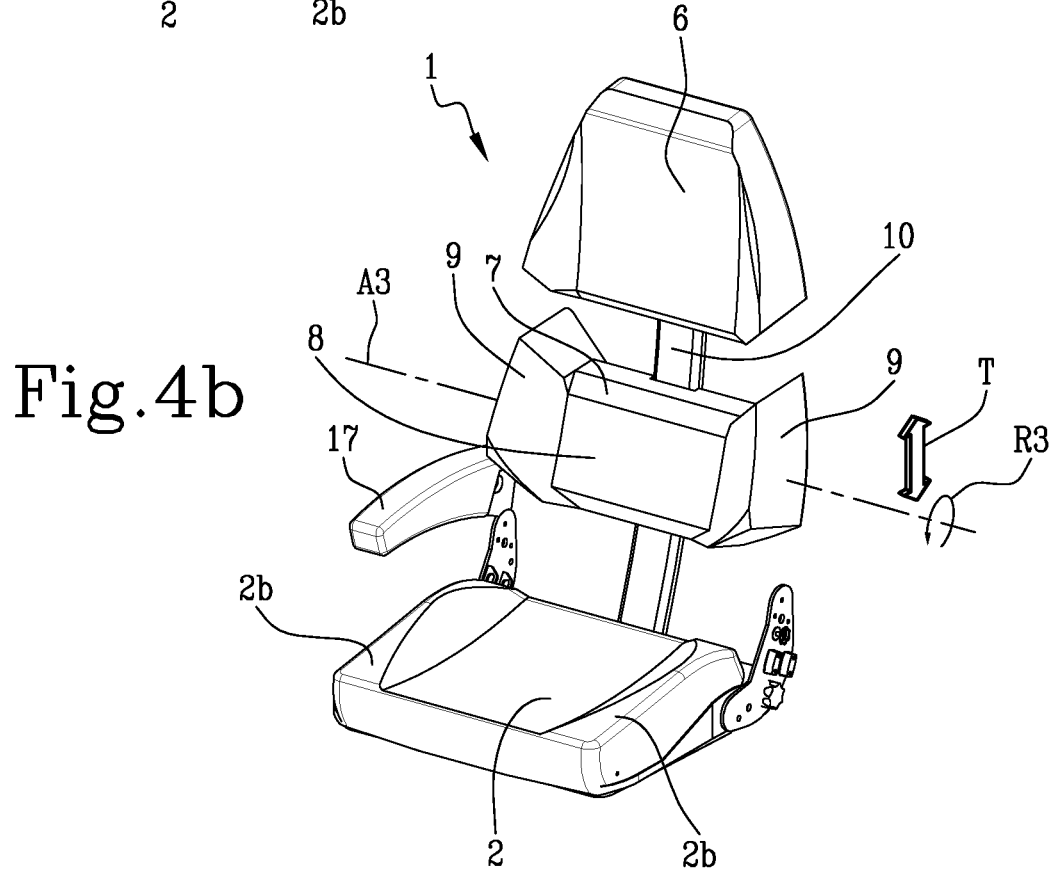

The seat 1 disclosed above allows to overcome the problems resulting from the prior art. In particular the seat 1 allows to adjust the lumbar portion 7 according to the needs of the user. In particular the seat 1 allows to adjust the position of the lumbar portion 7 as a function of the position of the shoulder portion 6, as shown in FIGS. 4a and 4b thus increasing the comfort of the seat. The lumbar support 8 allows to further increase the comfort for the user. The connection 15 of the control assembly 14 with the screen interface 16 is a useful support in case the user does not know how and what to operate and would like to manually adjust the seat 1. In addition the seat 1 allows the first rotation "R1" around the rotation axis "A1" that supports the movement of the user in case it would be necessary for the user to check the rear implement operation or to look behind in case of manoeuvre. The second rotation "R2" around the axis "A2" allows you to adjust the inclination of the backrest 3 to further increase comfort.

The invention claimed is:

1. Seat (1) for agricultural vehicles, comprising:
   a seating surface (2) adapted to receive a user;
   a backrest (3) adaptable according to the user needs, said backrest (3) comprising a shoulder portion (6) and a lower lumbar portion (7);
   a support structure (4) configured to connect said seating surface (2) to said backrest (3);
   wherein said lumbar portion (7) is movable along said support structure (4), said shoulder portion (6) remaining at a fixed height with respect to said support structure (4), said lumbar portion (7) comprising a lumbar support (8) adjustable at least in depth along a transverse direction (X), perpendicular to a lying plane (P) of said backrest (3);
   wherein said support structure (4) comprises a central module (10), configured to support the lumbar portion (7) and the shoulder portion (6), and side brackets (11) arranged at the sides of the central module (10) and configured to connect to a base (12), said base (12) being configured to support the seating surface (2); wherein said side brackets (11) comprise spacers of different lengths as a function of the width of the seating surface (2).

2. Seat (1) according to claim 1, wherein said backrest (3) includes lateral elements (9) for containment.

3. Seat (1) according to claim 2, wherein said lateral elements (9) are placed in the lumbar portion (7).

4. Seat (1) according to claim 1, wherein the lumbar portion (7), the shoulder portion (6) and the seating surface (2) are realized in the form of pillows.

5. Seat (1) according to claim 1, further comprising a control unit (14) adapted to:
   select the shoulder portion (6) and/or the lumbar portion (7) and/or the lumbar support (8) to impart configuration changes to it;
   implement said configuration changes.

6. Seat (1) according to claim 5, wherein said control unit (14) comprises a button (14a), which can be pushed by the user, configured to select the shoulder portion (6) and/or the lumbar portion (7) and/or the lumbar support (8) to impart said configuration changes and a knob (14b), which can be rotated by the user, configured to implement said configuration changes and to show the position, usability and function associated to a handle (5a, 5b, 5c).

7. Seat (1) according to claim 6, wherein said button (14a) is integrated in said knob (14b), said button (14a) being encased in said knob (14b), thus making it multifunctional.

8. Seat (1) according to claim 5, comprising a screen interface (16) slaved to the control unit (14), said screen interface (16) being configured to display spatial configurations and/or said configuration changes of said shoulder portion (6) and/or said lumbar portion (7) and/or said lumbar support (8).

9. Seat (1) according to claim 1, wherein said central module (10) comprises sliding linkages (10a) and rotation linkages (10b) for adjusting the inclination and/or to allow the rotation of the shoulder portion (6) of the backrest (3).

10. Seat (1) according to claim 9, wherein said sliding linkages (10a) comprise a sliding rail (13) and two sliding units (13a, 13b), for height adjustment of the lumbar portion (7).

11. Seat (1) according to claim 10, wherein at least one of said sliding units (13a) is configured to adjust the depth of the lumbar support (8).

12. Seat (1) according to claim 9, wherein said rotation linkages (10b) allow a first rotation (R1) of the backrest (3) about a first axis of rotation (A1) parallel to the central module (10) itself and a second rotation (R2) of the backrest (3) about a second axis of rotation (A2) perpendicular to the first axis of rotation (A1) and located between said lumbar portion (7) and said seating surface (2).

13. Seat (1) according to claim 12, wherein said backrest (3) includes lateral elements (9) for containment; wherein at least one sliding unit (13a) is configured to allow the lateral elements (9) to rotate about a third axis of rotation (A3) parallel to the second axis of rotation (A2) and passing through the sliding unit (13a) itself.

14. Seat (1) according to claim 1, wherein said seating surface (2) is shaped to prevent the user's pelvis from sliding forward and/or laterally, in case of machining with strong longitudinal descents and steep transverse slopes.

15. Seat (1) according to claim 1, wherein said seating surface (2) comprises controls (5) to tilt, collapse and/or rotate the seat (1) itself, said controls (5) being arranged in a central and front portion of said seating surface (2).

16. Seat (1) according to claim 15, comprising mechanical linkages and/or servo-assistance elements for the implementation of the controls (5) to move the seat (1) itself.

17. Seat (1) according to claim 1, comprising two armrests (17), configured to be lifted, if necessary.

18. Seat (1) according to claim 1, wherein said backrest (3) includes lateral elements (9) for containment having a variable geometry.

19. Seat (1) according to claim 1, wherein said backrest (3) includes inflatable lateral elements (9) for containment having a variable geometry.

* * * * *